March 2, 1937. R. L. FITZSIMMONS 2,072,298

COMBINED DRAWBOLT AND CLAMP FOR SAW BLADES

Filed Jan. 2, 1936

INVENTOR
Robert L. Fitzsimmons

Patented Mar. 2, 1937

2,072,298

UNITED STATES PATENT OFFICE 2,072,298

COMBINED DRAWBOLT AND CLAMP FOR SAW BLADES

Robert L. Fitzsimmons, Indianapolis, Ind., assignor to E. C. Atkins and Company, Indianapolis, Ind., a corporation of Indiana Application January 2, 1936, Serial No. 57,150

1 Claim. (Cl. 145—33)

This device relates to a combined draw bolt and clamping device designed primarily for use in connection with hack saw structures, either power or manually operated and one feature of the invention is the provision of clamping members for holding the ends of the saw blade firmly in engagement with the frame.

A further feature of the invention is the provision of draw bolts and means for adjusting said bolts lengthwise.

A further feature of the invention is the provision of means for removably mounting the clamping members in the ends of the bolts and so arranging the same that an outward adjustment of the bolts will cause said clamping members to automatically griup the ends of the saw blade.

A further feature of the invention is in so constructing the clamping members that the customary anchoring openings in the ends of the saw blade and the pins on the draw bolts may be dispensed with and the blade held in engagement with the draw bolts by friction only.

A further feature of the invention is the provision of means for preventing casual disengagement of the clamping members from the ends of the draw bolts.

A further feature of the invention is the provision of means for directing outward pressure against the clamping members for positioning them for positive clamping engagement with the ends of the saw blade when the clamping bolts are moved outwardly.

In the accompanying drawing.

Figure 1:
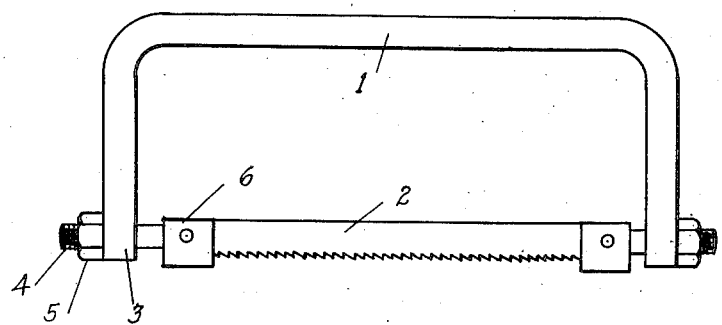
Figure 1 is a side elevation of a conventional saw carrying frame with a blade secured therein.
Figure 2:
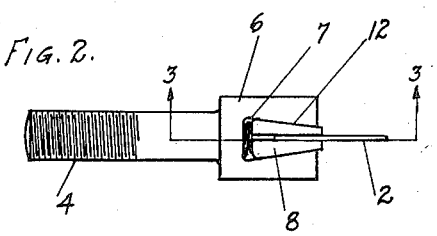
Figure 2 is an enlarged detail plan view of one of the draw bolts with the clamping members therein.
Figure 5:
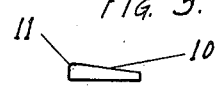
Figure 3:
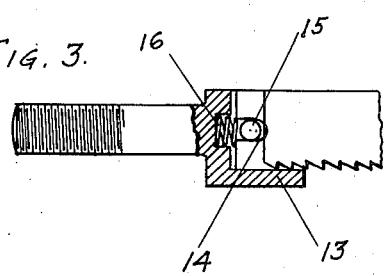
Figure 3 is a side elevation thereof, partly in section.
Figure 4:
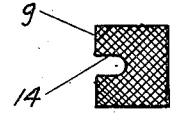
Figure 4 is a plan view of one of the clamping members removed from the draw bolt, and, Figure 5 is an edge elevation thereof.

Referring to the drawing, the numeral 1 indicates a conventional saw frame, which may be operated either mechanically or manually, for holding hack saw blades 2, the arms of the frame 1 having eyes or openings 3, as is customary in frames of this character.

Adapted to extend through said eyes 3 are draw bolts 4, the outer ends of which are threaded for receiving adjusting nuts 5 or the like, while the inner ends of the bolts are each provided with a head 6, in which is formed a slot or recess 7, in which is to be inserted pairs of clamping jaws 8 for engagement with the ends of the blade 2.

The meeting faces of the jaws 8 are preferably knurled, as shown at 9, although in some instances they may be left smooth, while the outer faces 10 thereof are tapered and the inner corners 11 rounded for more readily inserting them in the recesses 7 the corners of the recesses also having rounded portions for cooperation with the rounded corners 11. The tapered faces 10 engage tapered faces 12 of the slots or recesses 7, so that when the nuts are turned onto the bolts 4, a wedging action will be directed against the pairs of clamping jaws and cause them to firmly grip the ends of the saw blade 2.

Each recess 7 has a ledge 13 formed at its bottom edge upon which the jaws 8 rest and slide and by providing the inner ends of the pairs of jaws with elongated slits 14 open at one end for engagement with pins or bolts 15 extending transversely through the heads 6 and slots 7, the jaws 8 will be held against casual disengagement from the slots 7, while the ledges 13 will hold the jaws in alinement with each other. The slits 14 and pins 15 in some instances, may be dispensed with, if desired.

By providing the clamping jaws 8 for holding the ends of the saw blades 2, the objectionable pins and holes now commonly used for holding the blades in connection with the draw bolts may be dispensed with, thus obviating the possibility of tearing out the ends of the blades.

If desired, any suitable form of spring member 16 may be introduced between the closed ends of the recesses 7 and the jaw members 8, so that a sufficient outward pressure will be directed against the jaws for automatically positioning them for positive clamping action on the blade when one or both of the bolts 4 are moved outwardly. In assembling the jaws 8 in the slots 7, the open ends of the elongated slits 14 are directed downwardly and astride the pins 15. The solid ends of the jaws 8 are then swung towards the closed end of the slot 7 and owing to the rounded corners of the slots and jaws, the jaws will readily enter the slots 7 and rest in a horizontal plane on the blades 13. In this manner, the jaws 8 may be pivoted on said pins 15 and the jaws manually entered into or removed from said slots 7.

In applying the device to use, the ends of the blade 2 are placed between the pairs of jaws 8 and then turn one or both of the nuts 5 onto the bolts 4, which action will move the bolts lengthwise outwardly. As the bolts move outwardly, the frictional engagement of the jaws 8 with the opposite faces of the blade will cause the jaws to move toward the restricted ends of the recesses 7 until the blade is firmly gripped between the jaws and the blade drawn to the proper tension and as the strain on the blade is not limited to the perforations, as when pins are used for holding the blades, the danger of tearing out the ends of the blade is obviated.

It will likewise be seen that the blade may be inserted or removed without undue trouble or exertion and will be firmly held in position until the draw bolts are again operated to release the saw.

In addition to the above advantages, it will be seen that should the saw blade break off near its ends, the remainder of the blade may still be used by reclamping the blade between the jaws, which can not be done with the present form of blade holders.

What I claim is:

The combination with a draw bolt, a head at one end thereof having a recess therein the corner portions thereof being rounded, a ledge at one extremity of said recess, and a pin extending transversely through said head and recess, of a pair of clamping jaws adapted to enter said recess and rest on said ledge, the inner ends of said jaws having aligning elongated slits open at one end, the outer corners of said jaws having rounded portions for cooperation with the rounded corners of said recess, whereby said jaws may be pivoted on said pin for entering the jaws into or removing the same from said recess.

ROBERT L. FITZSIMMONS.